July 30, 1968　　　　H. MOHLE ET AL　　　　3,394,588
APPARATUS FOR MEASURING THE ADHESIVE STRENGTH
OF ADHESIVE STRIPS
Filed March 7, 1966　　　　　　　　　　　　3 Sheets-Sheet 1

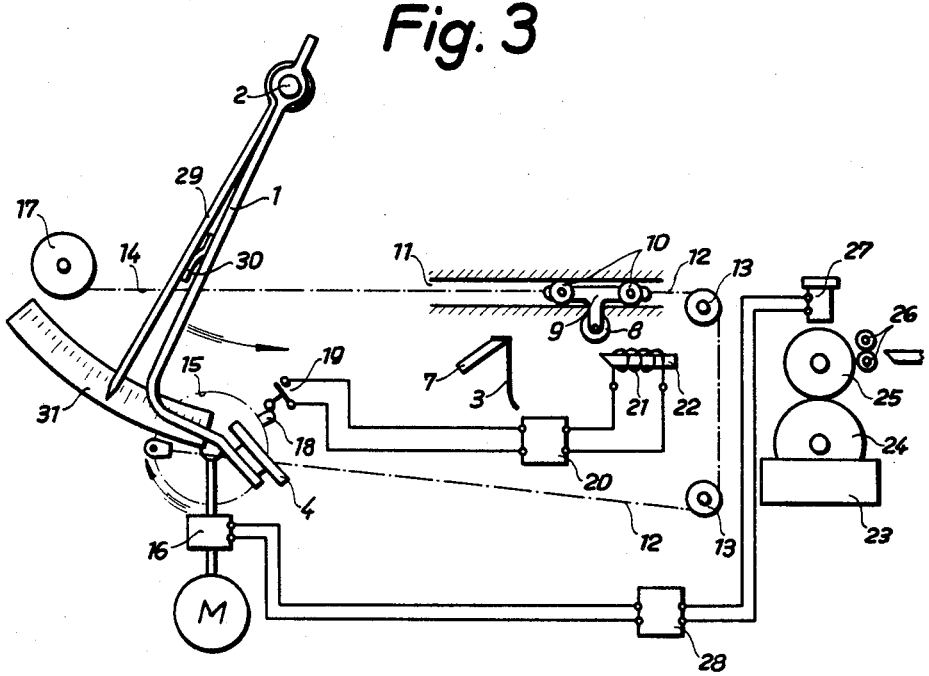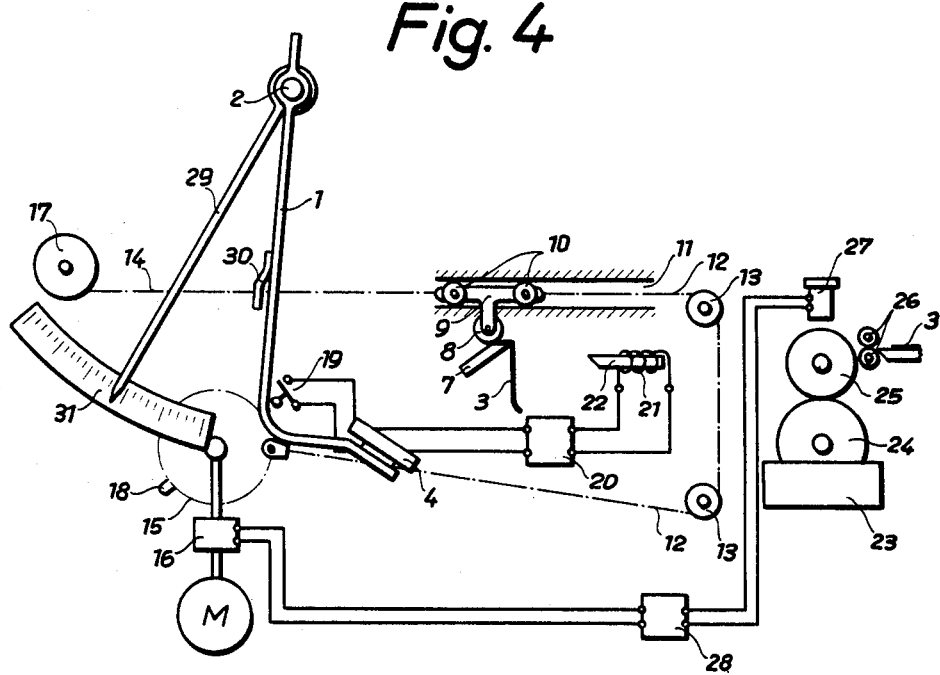

United States Patent Office 3,394,588
Patented July 30, 1968

3,394,588
APPARATUS FOR MEASURING THE ADHESIVE STRENGTH OF ADHESIVE STRIPS
Horst Mohle, Hilden, and Reiner Niewind, Dusseldorf, Germany, assignors to Jagenberg-Werke AG, Dusseldorf, Germany
Filed Mar. 7, 1966, Ser. No. 532,190
Claims priority, application Germany, Apr. 6, 1965, J 27,845
4 Claims. (Cl. 73—150)

ABSTRACT OF THE DISCLOSURE

The adhesive strength of adhesive strips is measured. The strips are fed onto a base, part of which is stationary and part of which is attached to one end of a pendulum. The strip is pressed onto the base. The pendulum is then released and allowed to fall by gravity, whereby the pendulum part of the bast is stripped from the adhesive strip. As the pendulum swings, it moves a pointer along a scale to indicate the adhesive strength of the strip. The operation is made automatic by the use of sensing means and time relay means.

---

Figure 1:
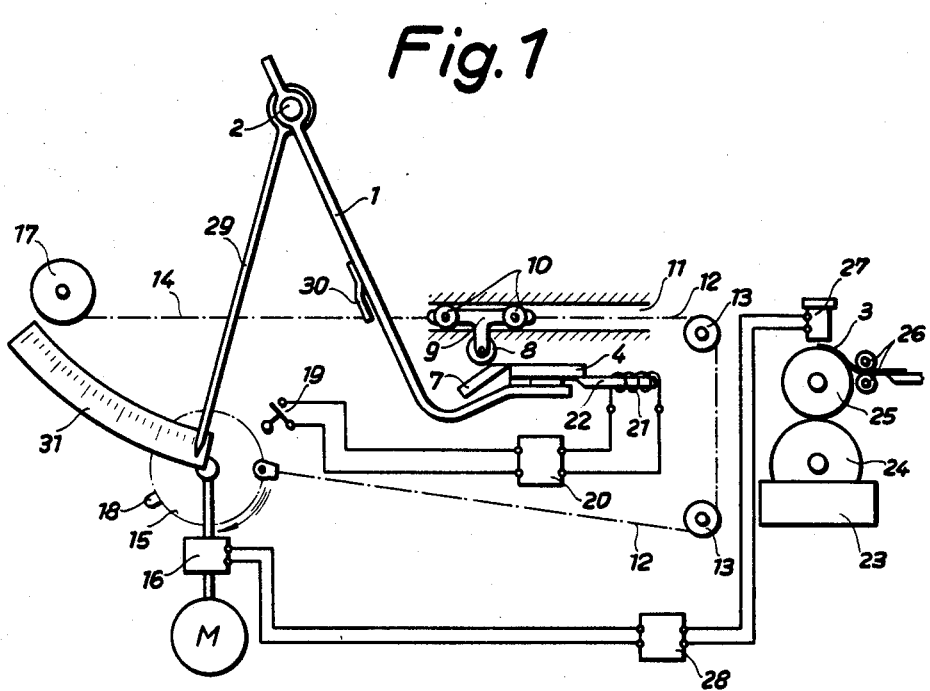
Figure 2:
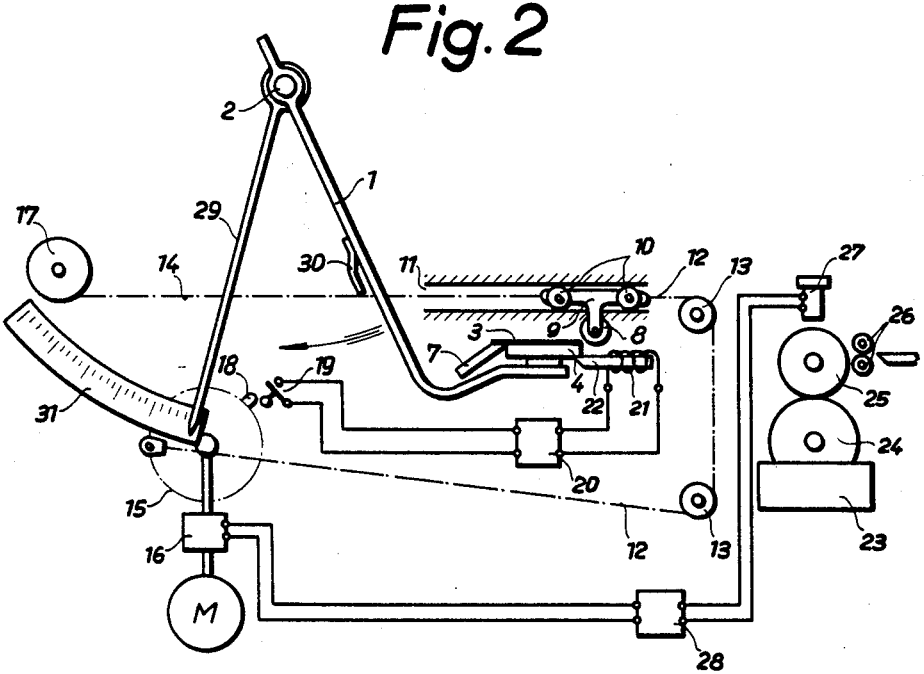
Figure 5:
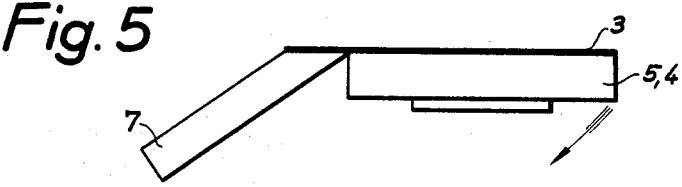
Figure 6:
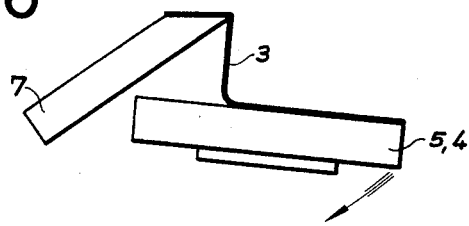
Figure 7:
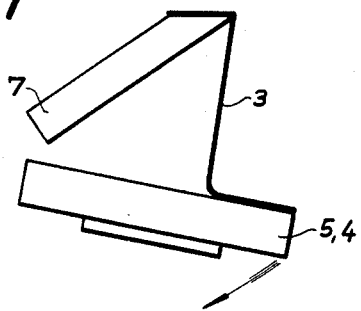
Figure 8:
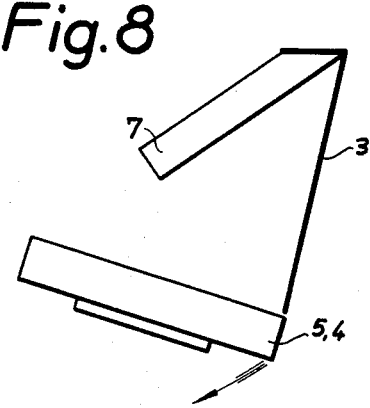

The present invention relates to an apparatus for measuring the adhesive strength of articles, particularly gummed adhesive strips.

More specifically, the invention is directed to the measurement of the adhesive strength of gummed adhesive strips which, after such strips have been moistened and applied to a supporting base, are removed or "peeled off" of the base.

With equipment of the foregoing character it is possible for the manufacture of gummed adhesive strips or the like to monitor the production of the articles on a current basis as well as effect testing with newly developed adhesive materials. In addition, this apparatus is of value to the ultimate consumer since it permits the testing of the quality of the adhesive strips offered for purchase.

Generally speaking, it has been customary to measure the adhesive strength of such strips by pressing the adhesive strip to be measured, after the moistening thereof upon a suitable backing material and from which backing material the strip is peeled off under conditions providing for measurement of the pulling force or effect necessary. With the apparatus utilized for achieving the above-mentioned method the means for developing and transmitting the peeling off force as well as the inclusion of the measuring means into the kinematic arrangement introduces a series of variable influence factors which tend to impair the accuracy, comparability and correct reproduction of the test values. Moreover, this type of apparatus necessitates a considerable amount of technical attention and servicing during the measuring operation, thereby introducing still further sources for error in the ultimate computations.

It has heretofore been proposed to develop the peeling off force by the use of a pendulum and transmit such force to the adhesive strip undergoing testing. This particular arrangement is such that the amplitude of the swing of the pendulum is transmitted to a carriage supporting the base to which the adhesive strip is applied by means of a traction rope or the like and the carriage is capable of movement in a suitable guideway. However, with this type of equipment a substantial portion of the force of the pendulum is not effective as a peeling off force but rather is consumed by the internal friction of the carriage. It should be noted that the internal friction above-mentioned is subject to various environmental influences, thus again resulting in variable test values.

The salient object of this invention is to provide an apparatus for measuring the adhesive strength of adhesive strips which eliminates materially the influences of inaccuracy which arise from the utilization of of the apparatus as well as sources of error in technical operation, thereby assuring the realization of accurate and reproducible test values.

Another object of the present invention is to provide an apparatus for measuring the adhesive strength of adhesive strips and the like which is relatively simple in structural detail, positive and efficient in operation and capable of being readily and inexpensively manufactured.

In order to solve the problems existing in the art the present invention is directed to the concept of, following the moistening of the adhesive strip and its intimate application upon a supporting base, peeling off the strip from the base together with the simultaneous measurement of the peeling off force required by means of the direct utilization of gravity and, more particularly, the peeling off of the strip from the base is effected by the force of gravity acting directly on the supporting base.

By virtue of the foregoing in which the force of gravity is directly employed as the peeling off force, and since such force of gravity is not subject to changing influences, the measurement of the peeling off force necessary is accurately determined.

The present apparatus comprises essentially a pendulum having suitably attached to the free end thereof a supporting base to which the adhesive strip is applied. One end of the adhesive strip which projects beyond the supporting base viewed in the direction of the effective swing of the pendulum, is secured to a fixed support which defines an extension of the supporting base in the initial position thereof and the strip is peeled off of the base by the force of the pendulum with the magnitude of the swing of the pendulum serving as a measurement for determining the adhesive strength of the adhesive strip.

In order to insure comparability and accuracy in reproduction of the measured values, it is essential to fix the time period utilized by the testing operation in an invariable manner and, for this purpose, the means for moistening the strip has operably related thereto means actuated by the adhesive strip functioning to release a preset course of control for the measuring operation. In a preferred embodiment, the means for moistening the strip is provided with a scanning member located in the path of movement of the adhesive strip with the impulse of such scanning member releasing by way of time delay relay means initially the means for pressing the adhesive strip upon the supporting base and thereafter the means for peeling the strip from the supporting base.

Due to the foregoing controls any human errors in technical operation are eliminated and the time period which elapses between the moistening of the strip and its being pressed upon the supporting base and the time which elapses between such pressing of the strip upon the base and the peeling off of the strip from the base are maintained constant in every situation.

Figure 9:
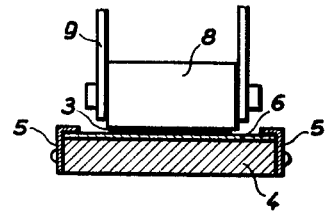

Further important objects and advantages of the invention will become more readily apparent from the following detailed description and attached drawings, and in which drawings:

FIGURES 1–4 diagrammatically illustrate in side elevation the various steps of the testing operation, FIGURES 5–8 illustrate diagrammatically on an enlarged scale the sequence of steps of the peeling off operation, and FIGURE 9 is a fragmentary end view partly in elevation and partly in cross section on an enlarged scale of the supporting base to which the adhesive strip is to be applied and the means for applying or pressing the strip onto the supporting base.

As best shown in FIGURES 1–4, the apparatus comprises a pendulum 1 which is swingable about a fixed pivot point 2 and a supporting base 4 is suitably attached to the lower or free end of the pendulum 1, with the base 4 being adapted to receive an adhesive strip 3 to be tested. As shown in FIGURE 9, the upper surface of the supporting base 4 is provided with a sheet or layer 6 of cardboard or the like and the sheet 6 is attached to the base by clamping strips 5. After each testing operation, the sheet 6 is replaced. With reference to FIGURE 1, it will be noted that an extension of the base 4 in its initial position is constituted by a stationary plate 7 to which the end of the strip 3 which projects beyond the base 4 is attached by means of adhesion or a suitable clamping.

A pressure roller 8 is mounted for freely rotatable movement in a holder 9 provided with forward and rearward pairs of rollers 10 for movement in a slot or recess 11 having upper and lower guide surfaces. The roller 8 is mounted to pass above the base 4 and the stationary plate 7. In order to move the roller 8 from the position shown in FIGURE 1 to that in FIGURE 2 a cord or the like 12 is attached to one end of the holder 9, trained about guide rollers 13 and secured at its other free end to a disc 15 which is driven by a motor M by way of a single revolution coupling 16. The movement of the holder 9 in the opposite direction is effected by means of a second cord or the like 14 attached at one end to the opposite end of the holder 9 and at its other end to a drum 17 which is rotated in a clockwise direction by means of a spring (not shown).

The disc 15 is also provided with a lug or projection 18 on its periphery which serves for activating a switch 19 and the closing of the switch by way of a time delay relay 20 results in the excitation of a magnet 21 which in turn activates a lock pin 22 for releasing the pendulum 1 so that the pendulum is free to swing.

As previously mentioned, means are provided for moistening the strip 3 to be tested and such means include a water reservoir or tank 23, a roller 24 immersed in the reservoir and an applicator roller 25 mounted above the roller 24 and in peripheral contact therewith. A pair of feed rollers 26 are mounted in advance of the applicator roller 25 and function to feed the strip to the periphery of the roller 25 for moistening purposes. A light barrier or scanning member 27 that is, a sensing means, is supported directly above the applicator roller and the impulse from which that is initiated responsive to the forward movement of the strip 3 passing beneath the light beam to interrupt same, results in the activation of the coupling 16 by way of a time delay relay 28.

In order to indicate the magnitude of the swing of the pendulum 1 it will be noted that a trailing pointer 29 is swingable about fixed pivot point 2 and is carried along with the movement of the pendulum by means of a projection or the like 30 secured to the pendulum 1. The pointer 29 coacts with a suitable scale 31 so that an operator can readily determine from the scale the magnitude of the swing of the pendulum.

While the mode of operation of the present invention is believed to be readily apparent from the above description, it may be summarized as follows:

Referring first to the initial position disclosed in FIGURE 1, the strip 3 is fed by the rollers 26 to the applicator roller 25 and, following the moistening of the strip, the strip is placed upon the cardboard sheet 6 on the supporting base 4 with the end portion projecting beyond the base 4 and being applied to the stationary plate 7. The impulse generated by the sensing means, i.e., light barrier 27 due to the forward movement of the strip therebelow passes through the time delay relay 28 and activates the single revolution coupling 16. Consequently, the disc 15 has movement imparted thereto in the direction shown by the arrow and, by virtue of the cord 12, the holder 9 is moved to the position illustrated in FIGURE 2 whereupon the roller 8 presses the adhesive strip 3 upon the stationary plate 7 and sheet 6 of the base 4.

During the rotation of the disc 15 the projection 18 closes the switch 19, thus exciting the magnet 21 via the second time delay relay 20 and hence the pin 22 is activated to release the pendulum 1. By virtue of the force of gravity the pendulum swings in a clockwise direction and the strip 3 carried by sheet 6 of base 4 and also attached to the stationary plate 7 is peeled off from the downwardly moving supporting base 4 and the sequential steps of such peeling off are shown in FIGURES 5–8 respectively, with the peel off angle remaining substantially constant.

Referring to FIGURE 3, it will be seen that the pointer 29 is moved along with the swing of the pendulum 1 and the pointer remains in the end position determined by the greatest swing of the pendulum, whereby the magnitude of the peeling off force can be ascertained from the scale 31 which is preferably marked in cm.·kp. (centimeters times kilopounds, pounds being the unit of weight and therefore the force as contrasted to grams which is the unit of mass). In the meantime, the holder 9 and roller 8 have again assumed the initial position shown in FIGURE 1 by reason of the clockwise rotation of the drum 17. Hence, the pendulum 1 can be returned to its initial position and held therein by engagement with the pin 22. The apparatus is now in its initial position and n condition for a new test operation adapted to be initiated by the feeding of another adhesive strip 3 to the applicator roller 25.

The invention is not to be confined to any strict conformity to the showing in the drawings but changes or modifications may be made therein so long as such changes or modifications mark no material departure from the spirit and scope of the appended claims.

What is claimed is:

1. An apparatus for measuring the adhesive strength of an adhesive strip and the like, comprising a supporting base for a moistened adhesive strip, removing means operatively related to said supporting base for removing said adhesive strip from said supporting base by the action of gravity, said removing means including a pendulum having opposite ends, a fixed pivot means about which one end of said pendulum is mounted for swinging movement, means securing said supporting base to the other end of said pendulum and further means operatively related to said removing means for simultaneously indicating the force necessary for removing the adhesive strip.

2. Apparatus for measuring the adhesive strength of an adhesive strip and the like as claimed in claim 1 further including a stationary plate located in the path of effective swinging movement of the pendulum defining an extension of said supporting base when said supporting base is in its initial position, and said adhesive strip having a portion projecting beyond the end of said supporting base viewed in the direction of swinging movement of the pendulum affixed to said stationary plate.

3. Apparatus for measuring the adhesive strength of an adhesive strip and the like as claimed in claim 2 including means for moistening said adhesive strip, means for holding said pendulum and supporting base in strip receiving position, time delay control means for releasing said holding means, sensing means located in spaced relationship to said moistening means and operative responsive to the passage of said moistened adhesive strip relative thereto for actuating said time delay control means to release said holding means so as to permit said pendulum to swing due to the force of gravity.

4. Apparatus for measuring the adhesive strength of an adhesive strip and the like as claimed in claim 3 and further including pressing means for pressing the moistened adhesive strip upon said supporting base, said time delay control means actuating said pressing means, and said time delay control means being operative responsive to the passing of said moistened adhesive strip relative to said sensing means to initially actuate said pressing means for pressing the strip upon said base and to thereafter release said holding means to free said pendulum for swinging movement due to the force of gravity.

References Cited
UNITED STATES PATENTS

| | | | |
|---|---|---|---|
| 2,604,783 | 7/1952 | Herrlinger | 73—150 |
| 3,124,955 | 3/1964 | Naslund et al. | 73—150 |

DAVID SCHONBERG, *Primary Examiner.*

J. NOLTON, *Assistant Examiner.*